No. 796,925. PATENTED AUG. 8, 1905.
H. McDERMOTT.
SAWMILL SET WORKS.
APPLICATION FILED JULY 12, 1897.

2 SHEETS—SHEET 1.

Witnesses
D. H. Blakelock
John C. Wilson

Inventor
Henry McDermott,
by Wilkinson & Fisher,
Attorneys.

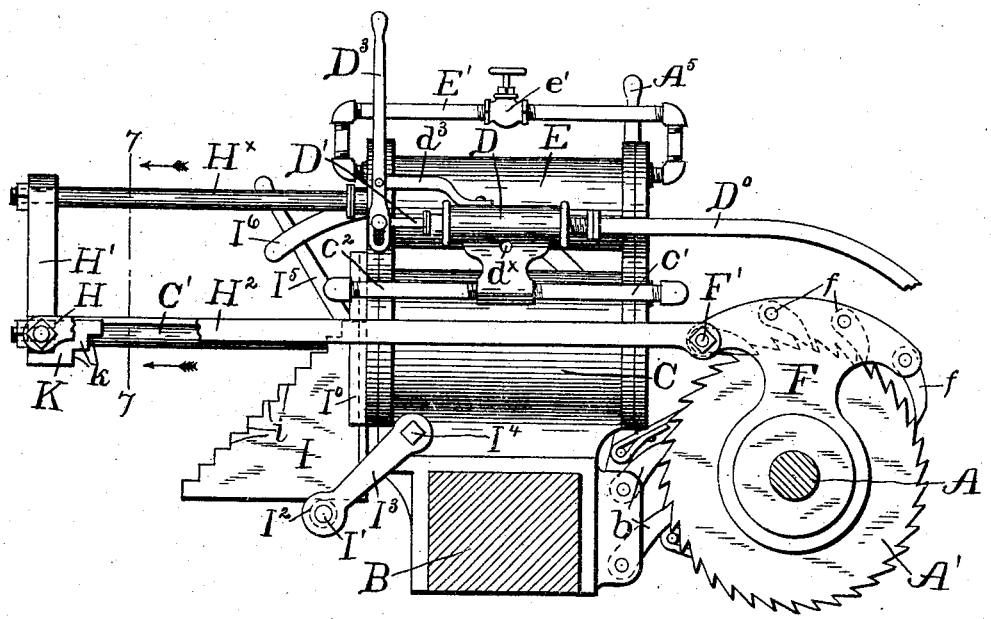
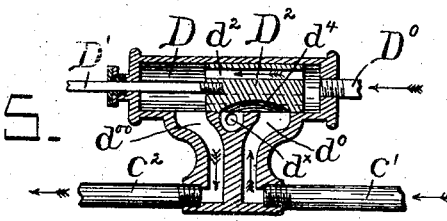
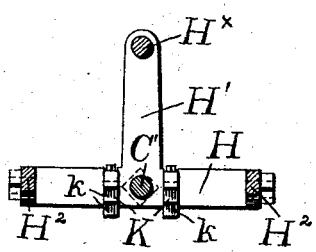
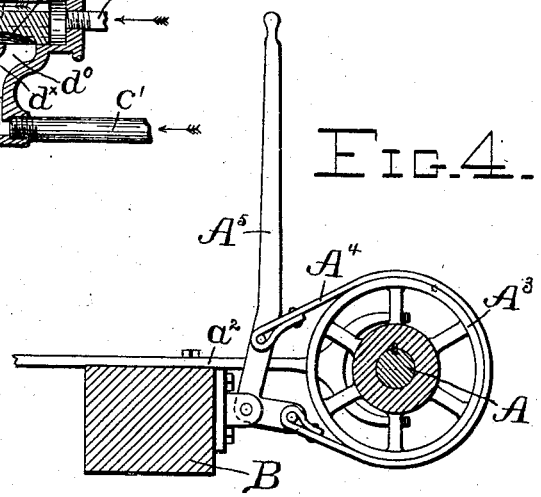

UNITED STATES PATENT OFFICE.

HENRY McDERMOTT, OF MARINETTE, WISCONSIN.

SAWMILL SET-WORKS.

No. 796,925.   Specification of Letters Patent.   Patented Aug. 8, 1905.

Application filed July 12, 1897. Serial No. 644,249.

*To all whom it may concern:*

Be it known that I, HENRY MCDERMOTT, a citizen of the United States, residing at Marinette, in the county of Marinette and State of Wisconsin, have invented certain new and useful Improvements in Sawmill Set-Works; and I do hereby declare the following to be a full, clear, and exact description of the invention, such as will enable others skilled in the art to which it appertains to make and use the same.

My invention relates to improvements in sawmill set-works; and it consists in the novel features hereinafter described and claimed.

Reference is had to the accompanying drawings, wherein similar parts are indicated by the same characters throughout the several views.

Figure 1:
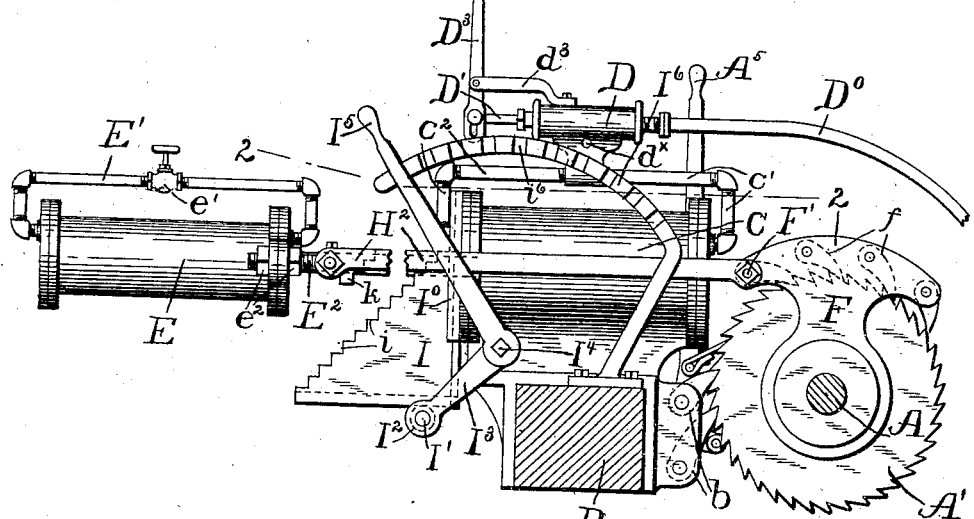
Figure 2:
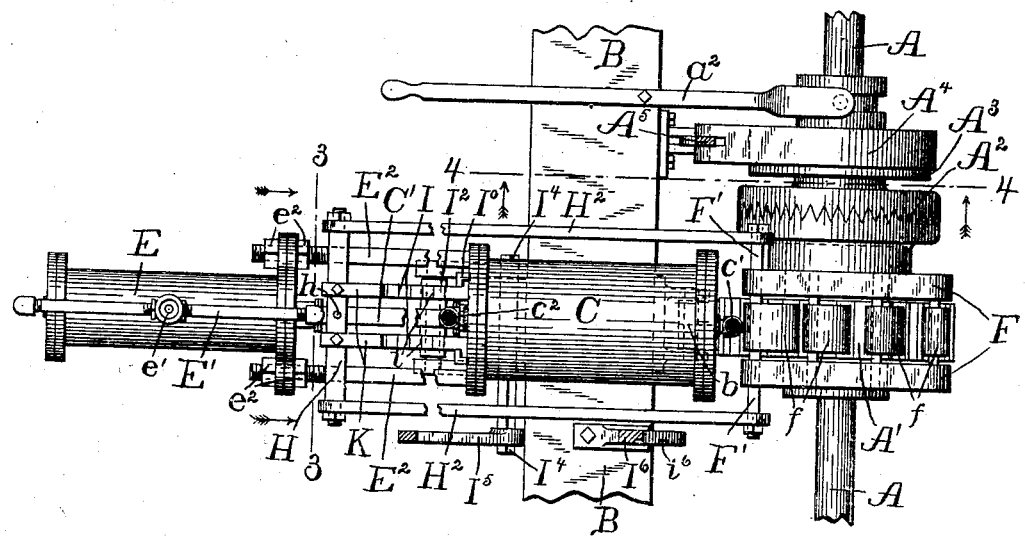
Figure 3:
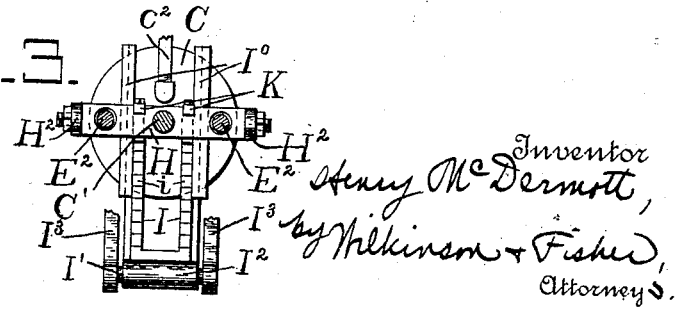

Figure 1 represents a side elevation of my improved set-works mechanism. Fig. 2 represents a sectional plan view of the devices shown in Fig. 1, the section being taken on the line 2 2 in said figure. Fig. 3 represents a vertical section taken on the line 3 3 in Fig. 2 and looking in the direction of the arrows. Fig. 4 represents a vertical section taken on the line 4 4 in Fig. 2 and looking in the direction of the arrows. Fig. 5 represents an enlarged detail vertical longitudinal section of the valve and its casings shown in Figs. 1 and 6 for admitting steam or air to the cylinder for operating the set-works. Fig. 6 represents a side elevation, slightly enlarged from Fig. 1, illustrating a modified arrangement of the parts shown in that figure; and Fig. 7 represents a vertical section taken on the line 7 7 in Fig. 6 and looking in the direction of the arrows.

A represents a portion of the set-shaft of a sawmill-carriage, only so much thereof being shown as is necessary to illustrate my invention.

A' represents a ratchet-wheel, which is mounted loosely upon the set-shaft and is engaged by a clutch $A^2$, keyed upon said shaft and operated by a hand-lever $a^2$, arranged in any suitable manner upon the carriage. $A^3$ represents a friction-wheel on the sleeve of the said clutch, over which passes a band-brake $A^4$, operated by a bell-crank lever $A^5$ for preventing the too rapid rotation of the shaft A by the receding mechanism when the clutch is released from the ratchet-wheel A', as shown most clearly in Fig. 4.

B represents a portion of the rear timber of a sawmill-carriage. Upon this timber is mounted a steam or air cylinder C, having pipes $c'$ and $c^2$ entering the opposite ends thereof.

D represents a valve-casing, (shown most clearly in Fig. 5,) to which is connected the steam or air supply pipe $D^0$ and the branch pipes $c'$ and $c^2$, the latter pipes leading to the opposite ends of the cylinder C. A piston-valve $D^2$ is mounted in said casing D and connected thereto is a piston-rod $D'$, which moves in one end of said casing and is operated by a hand-lever $D^3$, pivoted to an arm $d^3$, mounted upon said valve-casing, as shown in Figs. 1 and 6, or upon any other convenient part of the apparatus. The piston $D^2$ is provided with a longitudinal opening $d^2$, through which the steam may pass around said piston. The casing D has ports $d^0$ and $d^{00}$, connecting with the branch pipes $c'$ and $c^2$, respectively, and an exhaust-port $d^\times$. The piston $D^2$ is provided with a recess $d^4$ along one side, which passes over the said ports when the valve is moved and opens and closes the ports $d^0$ and $d^{00}$, but allows the exhaust-port $d^\times$ to remain always open, as will be seen from an inspection of Fig. 5.

C' represents a piston-rod entering the head of the cylinder C at one end and entering the head of another cylinder E at its opposite end. The latter cylinder E is preferably smaller than the cylinder C and is filled with oil or other suitable fluid, which acts as a cushion to the piston therein, the oil or other fluid passing from end to end of the said cylinder through the pipe E', which has a valve $e'$ therein, by means of which the resistance of the fluid may be regulated by retarding more or less its passage through the said pipe E'. The cushion-cylinder and piston serve not only to prevent concussion and consequent injury to the mechanism, but also to prevent overthrow of the setting mechanism actuated by the piston in cylinder C and consequent uncertainty in the operation of the set-works and inaccuracy in the work. The head of the cylinder E is connected to the head of the cylinder C by two stay-rods $E^2 E^2$, which are made adjustable in the head of the cushion-cylinder E by means of clamping-nuts $e^2 e^2$. Instead, however, of having the cushion-cylinder E in line with the axis of the cylinder C and in rear thereof, as shown in Figs. 1 and 2, I may, if preferred, mount this cushion-cylinder upon the cylinder C, thus putting the parts into more compact form. Slight modifications are necessary to carry out this arrangement, as will be hereinafter described with reference to Fig. 6.

H represents a cross-head through which pass the piston-rod C' and the stay-rods E² E², as seen most clearly in Fig. 3. This cross-head H is fixed upon the piston-rod C' in any suitable manner, as shown at $h$, where a pin passes through said cross-head and said piston-rod, but is free to move upon the stay-rods E² E², which act as guides therefor.

H² and H² represent a pair of pitman-rods, which are pivoted at their rear ends to the cross-head H and are pivoted at their forward ends to a cross-rod F', which passes through the frame F, mounted loosely upon the hub of the ratchet-wheel A' and straddling said ratchet-wheel, as seen in Fig. 2. A plurality of pawls $f$ are pivoted in said frame and adapted to rest upon and engage the teeth on said ratchet-wheel and rotate the same forward when the frame F is swung about its pivotal point in the forward direction, but to pass over the teeth on said ratchet-wheel when the frame is swung backward, as will be obvious. A plurality of pawls $b$, pivoted in a frame B² upon the side of the base-timber B, also engage the teeth on said ratchet-wheel and hold the same against backward rotation when the pawls $f$ are released or not in operation. The pawls $b\ b$ and $f\ f$ are arranged in the stationary frame B² and vibrating frame or pawl-carrier F, respectively, in such manner as to divide the space between the teeth of the ratchet-wheel A', and thus insure the engagement of one pawl of either set with a tooth of said ratchet-wheel and avoid lost motion at whatever point either the ratchet-wheel or the vibrating pawl-carrier F may stop. The backward movement of the piston-rod C' carries with it the cross-head H and pitman-rods H², which swing the frame F backward, moving the pawls $f$ over the teeth on the ratchet-wheel A', and the forward movement of the said piston-rod and its connections causes the frame F to swing forward, and the pawls $f$ engaging, as they will, the teeth on the ratchet-wheel during such movement, the said ratchet-wheel (if the clutch A² be in engagement with said wheel) will turn the set-shaft A the desired distance and advance the knees of the carriage accordingly, as will be evident to any one skilled in the art.

For regulating the depth of the cut for boards of varying thickness I provide the following devices for limiting the forward thrust of the piston-rod C', which operates the set-shaft A, as above described: A frame I, provided with steps $i$ thereon, is mounted in a vertical slideway I⁰, upon the rear end of the cylinder C, as seen in Figs. 1 and 6. A short shaft I' passes through a sleeve I², on which the base of said frame I rests, and upon the ends of this shaft I' are mounted a pair of swinging arms I³ I³, which arms are also fixed upon a shaft I⁴, rotatably mounted in bearings beneath the cylinder C. A hand-lever I⁵ is mounted upon one end of the shaft I⁴, and by means of this lever the said shaft may be rotated and the arms I³ swung up or down, moving the frame I carried thereby up or down accordingly. The hand-lever I⁵ will be held in the position desired by engagement with one of the notches $i^6$ on the segment-bar I⁶, as seen most clearly in Fig. 1. A pair of blocks K K, rigidly mounted upon the cross-head H and provided with inverted steps $k\ k$ thereon, are adapted to strike against the frame I at the forward end of the stroke of the piston-rod C', and thereby prevent its further forward movement, the steps $k$ on the blocks K fitting into the opposite steps on the frame I, which latter frame is adjusted vertically by means of the hand-lever I⁵, as above described. Thus the frame I would be lowered to produce a thicker board and raised to produce a thinner board, as will be obvious.

In the arrangement shown in Fig. 6, wherein the cushion-cylinder is mounted upon the cylinder C, the cross-head H has a vertical rigid arm H' thereon, which is connected to a second piston-rod H<sup>×</sup>, working in the head of the cushion-cylinder E, and the stay-rods H² H² (shown in Figs. 1 and 2) are omitted as not being required. In all other respects the construction and operation of the mechanism is the same as with the arrangement shown in Figs. 1 and 2.

To recede or run the knees back on the head-blocks, the clutch A² is disengaged from the ratchet-wheel A', thus permitting the set-shaft to turn back in the ratchet-wheel independently of the actuating mechanism of the set-works, or, with the provision common in this class of set-works for lifting and holding the pawls out of engagement with the ratchet-wheel, the clutch A² may be dispensed with and the ratchet-wheel made fast on the set-shaft.

My improvements are applicable also to that class of set-works in which a friction-wheel and friction grips or clutches are employed in place of the ratchet-wheel and pawls hereinbefore described, and I do not wish to be understood as limiting my invention to the use of these specific devices, which in themselves are not new.

From the foregoing description the operation of the various parts will be clear to any one skilled in the art.

Having thus described my invention, what I claim, and desire to secure by Letters Patent of the United States, is—

1. In a sawmill set-works, the combination with the set-shaft; a ratchet-wheel mounted loosely thereon; a clutch on said shaft adapted to engage said ratchet-wheel; a swinging frame carrying a set of pawls adapted to engage the teeth on said ratchet-wheel; and another set of pawls mounted in immovable supports also adapted to engage the teeth on said ratchet-wheel; of a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; stop-blocks on said cross-head; an adjustable frame having stops thereon, mounted at the head of the operating-cylinder; means for adjusting said frame to regulate the thickness of the boards; and a cushion-cylinder having a piston-rod connected with said cross-head substantiallly as described.

2. In a sawmill set-works, the combination with the set-shaft; a ratchet-wheel mounted loosely thereon; a clutch on said shaft adapted to engage said ratchet-wheel; a swinging frame carrying a set of pawls adapted to engage the teeth on said ratchet-wheel; and another set of pawls mounted in immovable supports also adapted to engage the teeth on said ratchet-wheel; of a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; a cushion-cylinder having a piston-rod working in one end thereof also connected to said cross-head; stop-blocks on said cross-head; an adjustable frame having stops thereon mounted at the head of the operating-cylinder; and means for adjusting said frame to regulate the thickness of the boards, substantially as described.

3. In a fluid-pressure-operated sawmill set-works, the combination with the set-shaft; a ratchet-wheel mounted loosely thereon; a clutch on said shaft adapted to engage said ratchet-wheel; a swinging frame carrying a set of pawls adapted to engage the teeth on said ratchet-wheel; and another set of pawls mounted in immovable supports also adapted to engage the teeth on said ratchet-wheel; of a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; a cushion-cylinder having a piston-rod working in one end thereof also connected to said cross-head; stop-blocks on said cross-head; a frame mounted in a vertical slideway and having steps thereon adapted to be struck by said stop-blocks; and means for vertically adjusting said stepped frame, substantially as described.

4. In a fluid-pressure-operated sawmill set-works, the combination with the set-shaft; a ratchet-wheel mounted loosely thereon; a clutch on said shaft adapted to engage said ratchet-wheel; a swinging frame carrying a set of pawls adapted to engage the teeth on the said ratchet-wheel; and another set of pawls mounted in immovable supports also adapted to engage the teeth on said ratchet-wheel; of a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; a cushion-cylinder having a piston-rod working in one end thereof also connected to said cross-head; stop-blocks on said cross-head; a frame mounted in a vertical slideway and having steps thereon adapted to be struck by said stop-blocks; a shaft journaled in fixed bearings on the carriage; a pair of swinging arms rigidly mounted upon said shaft; a cross-rod connecting said swinging arms, and supporting said frame; and a hand-lever mounted upon said shaft for turning the same and swinging said arms, substantially as described.

5. In a sawmill set-works, the combination with the set-shaft; a ratchet-wheel mounted loosely thereon; a clutch on said shaft adapted to engage said ratchet-wheel; a band-brake on said clutch; a swinging frame carrying a set of pawls adapted to engage the teeth on said ratchet-wheel; and another set of pawls mounted in immovable supports also adapted to engage the teeth on said ratchet-wheel; a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; stop-blocks on said cross-head; a frame mounted in a vertical slideway and having steps thereon adapted to be struck by said stop-blocks means for vertically adjusting said stepped frame; and a cushion-cylinder having a piston-rod connected with said cross-head substantially as described.

6. In a sawmill set-works, the combination with the set-shaft; a ratchet-wheel mounted loosely thereon; a clutch on said shaft adapted to engage said ratchet-wheel; a band-brake on said clutch; a swinging frame carrying a set of pawls adapted to engage the teeth on said ratchet-wheel; and another set of pawls mounted in immovable supports also adapted to engage the teeth on said ratchet-wheel; a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; a cushion-cylinder having a piston-rod working in one end thereof also connected to said cross-head; stop-blocks on said cross-head; a frame mounted in a vertical slideway and having steps thereon adapted to be struck by said stop-blocks and means for vertically adjusting said stepped frame, substantially as described.

7. In a sawmill set-works, the combination with the set-shaft; a ratchet-wheel mounted loosely thereon; a clutch on said shaft adapted to engage said ratchet-wheel; a swinging frame carrying a set of pawls adapted to engage the teeth on said ratchet-wheel; and another set of pawls mounted in immovable supports also adapted to engage the teeth on said ratchet-wheel; of a stationary fluid-cylinder mounted upon the carriage; pipes entering the ends of said cylinder; a slide-valve connecting said pipes; a feed-pipe connected to said valve; a piston-rod working in one end of said cylinder; a cross-head mounted rigidly upon said piston-rod; a pair of pitman-rods connected to said cross-head and to said swinging pawl-carrying frame; a cushion-cylinder having a piston-rod working in one end thereof also connected to said cross-head; a pipe leading from end to end of said cushion-cylinder; a regulating-valve in said pipe; stop-blocks on said cross-head; an adjustable frame having stops thereon mounted at the head of the operating-cylinder; and means for adjusting said frame to regulate the thickness of the boards, substantially as described.

8. In sawmill set-works, the combination with the set-shaft, of a cylinder and piston having a connection for turning said shaft, and a valve-controlled fluid-supply connection; a cushion-cylinder and piston for checking the movement of the main piston; and an adjustable stop for limiting the stroke of the main piston, substantially as and for the purposes described.

9. In sawmill set-works, the combination with the set-shaft, a wheel mounted thereon, and a vibrating device for turning said wheel; of a cylinder having a valve-controlled fluid-supply connection, a piston fitted to work in said cylinder and connected with said vibrating device; a cushion-cylinder and piston for checking the movement of the main piston, and an adjustable stop for limiting the stroke of the main piston, substantially as and for the purposes set forth.

10. A sawmill set-works, comprising a log-setting mechanism, a motor and connections between it and the setting mechanism for actuating said mechanism, a cushion device arranged to operate to prevent overthrow of the setting mechanism, and an adjustable positive stop to vary the stroke of the motor, substantially as described.

11. In a sawmill set-works, in combination, a reciprocating motor and adjustable positive stop for limiting the stroke of the motor, a retarding-cylinder for limiting the speed of the motor, a set-shaft for advancing the knees of a sawmill-carriage, and means actuated by the motor for rotating the said shaft, substantially as described.

12. In a sawmill set-works, in combination, a reciprocating motor and adjustable positive stop for limiting the stroke of the motor, a retarding-cylinder for limiting the speed of the motor, a set-shaft for advancing the knees of a sawmill-carriage, and a rocker member actuated by the motor for rotating the set-shaft.

In testimony whereof I affix my signature in presence of two witnesses.

HENRY McDERMOTT.

Witnesses:
T. E. ANDERSON,
C. W. MARKS.